(12) United States Patent
Cho et al.

(10) Patent No.: US 12,434,294 B2
(45) Date of Patent: Oct. 7, 2025

(54) RIVETING APPARATUS CAPABLE OF PREVENTING FASTENING OMISSION AND RIVETING METHOD USING THE SAME

(71) Applicant: LG ENERGY SOLUTION, LTD., Seoul (KR)

(72) Inventors: Jun Beom Cho, Daejeon (KR); Choon Kwon Kang, Daejeon (KR); Young Seop Kim, Daejeon (KR); Jun Young Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/701,768

(22) PCT Filed: Aug. 7, 2023

(86) PCT No.: PCT/KR2023/011594
§ 371 (c)(1),
(2) Date: Apr. 16, 2024

(87) PCT Pub. No.: WO2024/049039
PCT Pub. Date: Mar. 7, 2024

(65) Prior Publication Data
US 2024/0408666 A1    Dec. 12, 2024

(30) Foreign Application Priority Data

Aug. 31, 2022    (KR) .......................... 10-2022-0109710

(51) Int. Cl.
*B21J 15/12*    (2006.01)
*B21J 15/02*    (2006.01)
(Continued)

(52) U.S. Cl.
CPC ............... *B21J 15/12* (2013.01); *B21J 15/02* (2013.01); *B21J 15/16* (2013.01); *B21J 15/30* (2013.01);
(Continued)

(58) Field of Classification Search
CPC ... B21J 15/12; B21J 15/14; B21J 15/16; B21J 15/30; B21J 15/02; Y10T 29/5343
See application file for complete search history.

(56) References Cited

U.S. PATENT DOCUMENTS 5,427,297 A * 6/1995 Tymianski ............... B21J 15/32
                                                227/114
6,011,482 A * 1/2000 Banks .................. B23Q 9/0042
                                              29/407.05
(Continued)

FOREIGN PATENT DOCUMENTS

CN    207655830 U    7/2018
CN    109229514 A    1/2019
(Continued)

OTHER PUBLICATIONS

International Search Report (PCT/ISA/210) issued in PCT/KR2023/011594, dated Nov. 2, 2023.
(Continued)

*Primary Examiner* — Jermie E Cozart
(74) *Attorney, Agent, or Firm* — Birch, Stewart, Kolasch & Birch, LLP

(57) ABSTRACT

The present invention relates to a riveting apparatus capable of preventing fastening omission and a riveting method using the same, and more particularly to a riveting apparatus including a riveting unit, a moving unit connected to the riveting unit, the moving unit being configured to move the riveting unit, a first moving guide unit configured to guide the longitudinal movement of the moving unit, a pair of
(Continued)

second moving guide units located at longitudinal opposite ends of the first moving guide unit, the pair of second moving guide units being configured to guide the transverse movement of the first moving guide unit, a first position sensor provided under one end of the first moving guide unit, and a second position sensor provided under one end of one of the pair of second moving guide units and a riveting method using the same.

15 Claims, 3 Drawing Sheets

(51) Int. Cl.
    *B21J 15/16*     (2006.01)
    *B21J 15/30*     (2006.01)
    *B21J 15/44*     (2006.01)
    *B21J 15/14*     (2006.01)

(52) U.S. Cl.
    CPC ............ *B21J 15/44* (2013.01); *B21J 15/14* (2013.01); *Y10T 29/5343* (2015.01)

(56) References Cited

U.S. PATENT DOCUMENTS

| | | | |
|---|---|---|---|
| 6,523,245 | B2 | 2/2003 | Whiten et al. |
| 8,006,362 | B2 * | 8/2011 | Sarh .................. B21J 15/14 29/525.01 |
| 8,956,753 | B2 * | 2/2015 | Byun ................ H01M 50/567 429/158 |
| 2003/0188412 | A1 * | 10/2003 | Ilies .................. B23P 19/069 29/23.51 |
| 2018/0001429 | A1 | 1/2018 | Di Stefano et al. |

FOREIGN PATENT DOCUMENTS

| | | |
|---|---|---|
| CN | 210966821 U | 7/2020 |
| CN | 214053560 U | 8/2021 |
| CN | 113953439 A | 1/2022 |
| DE | 32 29 034 A1 | 2/1984 |
| EP | 1 679 139 A1 | 7/2006 |
| EP | 1 792 673 A2 | 6/2007 |
| JP | 59-89639 U | 6/1984 |
| JP | 2-262924 A | 10/1990 |
| JP | 4-231133 A | 8/1992 |
| JP | 5-104365 A | 4/1993 |
| JP | 7-100575 A | 4/1995 |
| JP | 2013-198918 A | 10/2013 |
| KR | 20-0160578 Y1 | 11/1999 |
| KR | 10-2005-0015633 A | 2/2005 |
| KR | 10-0485120 B1 | 4/2005 |
| KR | 10-1404244 B1 | 6/2014 |
| KR | 10-1574597 B1 | 12/2015 |
| KR | 10-2017-0106394 A | 9/2017 |
| KR | 10-1811626 B1 | 12/2017 |
| KR | 10-2018-0038271 A | 4/2018 |
| KR | 10-1990840 B1 | 6/2019 |
| KR | 10-2138604 B1 | 7/2020 |
| KR | 10-2394421 B1 | 5/2022 |

OTHER PUBLICATIONS

Extended European Search Report for European Application No. 23860719.6, dated Mar. 27, 2025.

* cited by examiner

[FIG. 1]
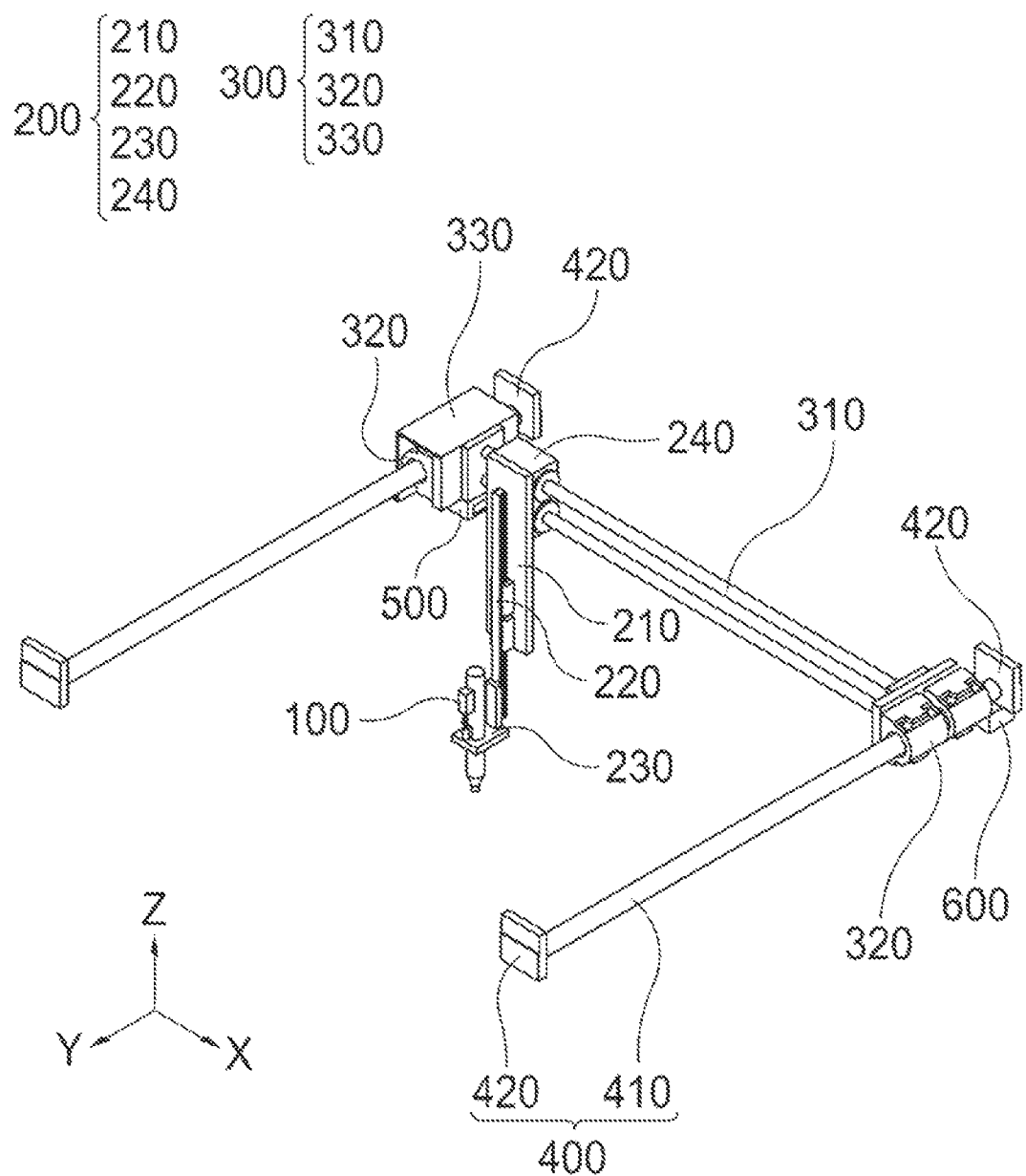

[FIG. 2]
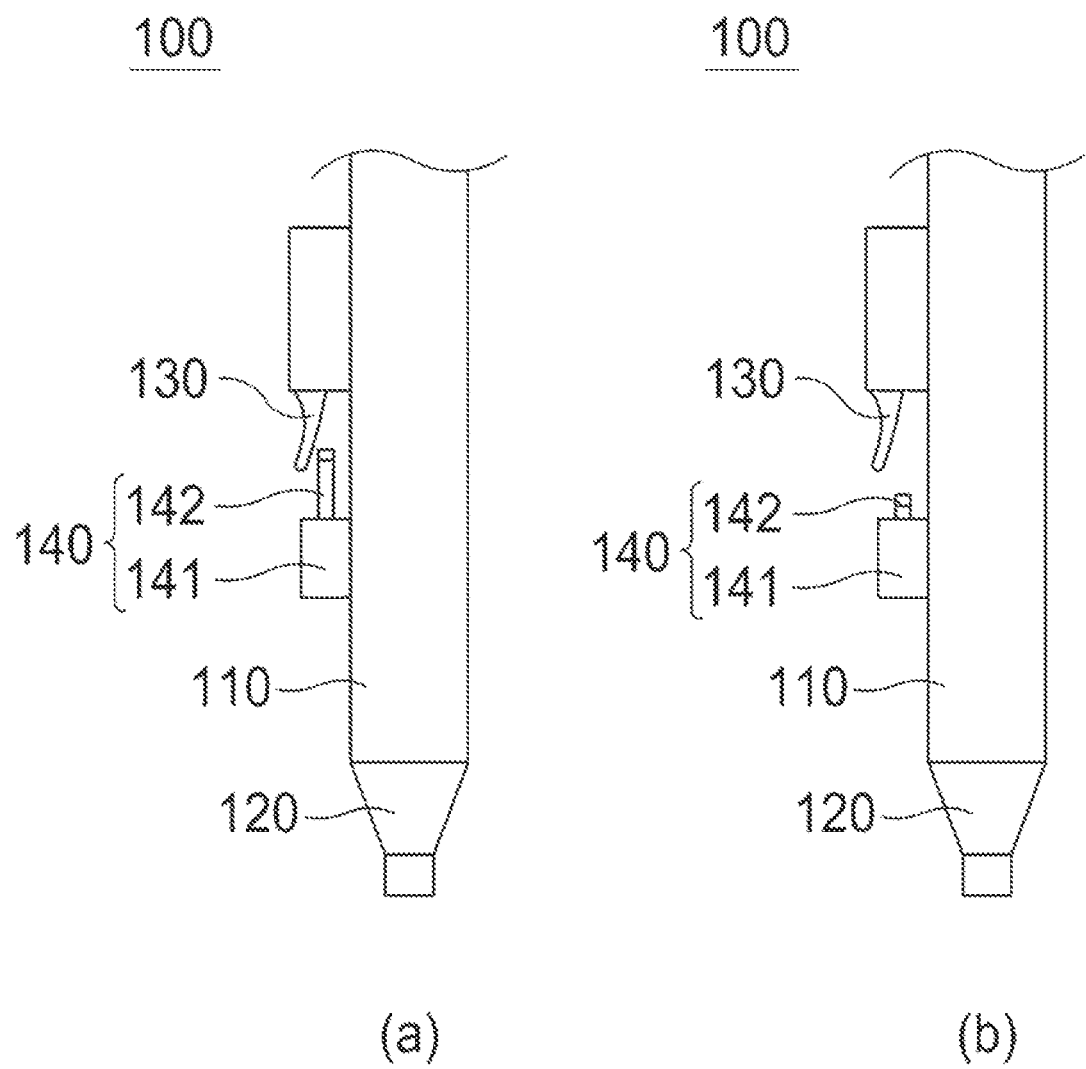

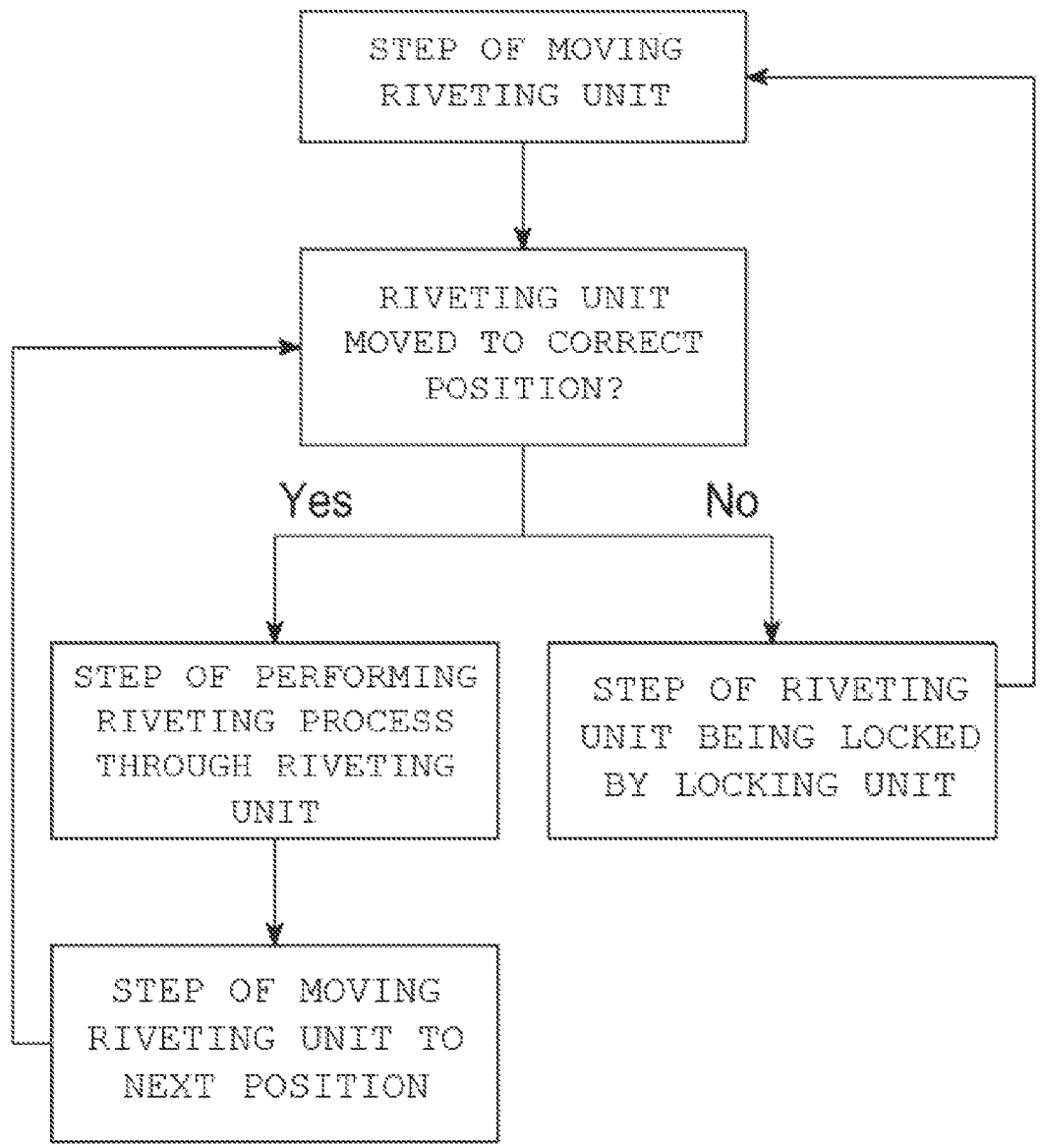
[FIG. 3]

RIVETING APPARATUS CAPABLE OF PREVENTING FASTENING OMISSION AND RIVETING METHOD USING THE SAME

TECHNICAL FIELD

This application claims the benefit of priority to Korean Patent Application No. 2022-0109710 filed on Aug. 31, 2022, the disclosure of which is incorporated herein by reference in its entirety.

The present invention relates to a riveting apparatus capable of preventing fastening omission and a riveting method using the same, and more particularly to a riveting apparatus capable of moving a riveting unit to a riveting position, thereby preventing fastening omission, and a riveting method using the same.

BACKGROUND ART

With recent development of alternative energies due to air pollution and energy depletion caused as the result of use of fossil fuels, demand for secondary batteries capable of storing electrical energy that is produced has increased. Secondary batteries, which are capable of being charged and discharged, are intimately used in daily life. For example, secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle, etc.

Meanwhile, when a battery module is manufactured, a plurality of battery cells is received in a module case, and the module case is sealed using a rivet gun in order to protect the same.

During a riveting process, however, a worker individually fastens a fastening member, such as a bolt, to a fastening position by directly operating the rivet gun, whereby fastening omission occurs, which leads to defects.

Therefore, there are limitations in the worker checking fastening positions one by one during the riveting process, resulting in fastening omission and production of defective products, which increases costs and reduces production efficiency.

Prior Art Document (Patent Document 1) Korean Patent Application Publication No. 2005-0015633

DISCLOSURE

Technical Problem

The present invention has been made in view of the above problems, and it is an object of the present invention to provide a riveting apparatus capable of preventing fastening omission that is capable of preventing the occurrence of a defect due to fastening omission of a fastening member during a riveting process and a riveting method using the same.

It is another object of the present invention to provide a riveting apparatus capable of preventing fastening omission that is capable of preventing fastening at an incorrect position during a riveting process and a riveting method using the same.

Technical Solution

In order to accomplish the above objects, a riveting apparatus according to the present invention includes a riveter, a mover connected to the riveter, the mover being configured to move the riveter, a first moving guide configured to guide the longitudinal (X-axis) movement of the mover, a pair of second moving guides located at longitudinal opposite ends of the first moving guide, the pair of second moving guides being configured to guide the transverse (Y-axis) movement of the first moving guide, a first position sensor provided under one end of the first moving guide, and a second position sensor provided under one end of one of the pair of second moving guides.

Also, in the riveting apparatus according to the present invention, the riveter may include a riveter body, a riveter head provided under the riveter body, a switch located at a side surface of an upper end of the riveter body, and a lock located at a lower end of the switch.

Also, in the riveting apparatus according to the present invention, the lock may include a lock body connected to the riveter body and a locking controller partially inserted in the lock body.

Also, in the riveting apparatus according to the present invention, the lock body may have a hydraulic device mounted therein, and the locking controller may be configured to be moved upwards and downwards by the hydraulic device.

Also, in the riveting apparatus according to the present invention, the mover may include a mover body, a guide rail formed at a side surface of the mover body so as to extend in a height (Z-axis) direction, a first connection portion configured to connect the guide rail and the riveter to each other, and a second connection portion configured to connect the mover body and the first moving guide to each other, and the first connection portion may be moved along the guide rail in a vertical direction.

Also, in the riveting apparatus according to the present invention, the first moving guide may include at least one first movement shaft, a third connection portion located at each of opposite ends of the at least one first movement shaft, and a cover member configured to cover at least a part of each of the third connection portions.

Also, in the riveting apparatus according to the present invention, each of the second moving guides may include a second movement shaft and a support member located at each of opposite ends of the second movement shaft.

Also, in the riveting apparatus according to the present invention, the first position sensor may be a laser sensor.

Also, in the riveting apparatus according to the present invention, the laser sensor may radiate a laser toward the second connection portion.

Also, in the riveting apparatus according to the present invention, the second position sensor may be a laser sensor.

Also, in the riveting apparatus according to the present invention, the laser sensor may radiate a laser toward the third connection portion.

Also, in the riveting apparatus according to the present invention, the at least one first movement shaft may be a plurality of shafts.

In addition, a riveting method using the riveting apparatus according to the present invention includes the steps of moving the riveter determining whether the riveter is at a correct position, performing a riveting process through the riveter, and moving the riveter to the next position.

Also, in the riveting method according to the present invention, when the riveter is not at the correct position in the step of determining whether the riveter is at the correct position, the riveter may be locked by the lock.

Also, in the riveting method according to the present invention, after moving the riveter again, the step of determining whether the riveter is at the correct position and the subsequent steps may be performed again.

In addition, the present invention provides a battery module manufactured using the riveting apparatus having the above-described features.

Advantageous Effects

As is apparent from the above description, a riveting apparatus capable of preventing fastening omission according to the present invention and a riveting method using the same have an advantage in that a first position sensor and a second position sensor are provided to measure the coordinates of a riveting unit, whereby it is possible to prevent fastening omission of a fastening member.

In addition, the riveting apparatus capable of preventing fastening omission according to the present invention and the riveting method using the same have an advantage in that a locking unit is provided at the riveting unit, whereby it is possible to prevent fastening at an incorrect position, and therefore it is possible to prevent production of defective products.

DESCRIPTION OF DRAWINGS

FIG. 1 is a perspective view showing a riveting apparatus according to a preferred embodiment of the present invention.

FIG. 2 is a plan view showing a riveting unit in the riveting apparatus according to the preferred embodiment of the present invention.

FIG. 3 is a flowchart illustrating a riveting method using the riveting apparatus according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is the to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a riveting apparatus capable of preventing fastening omission according to the present invention and a riveting method using the same will be described with reference to the accompanying drawings.

FIG. 1 is a perspective view showing a riveting apparatus according to a preferred embodiment of the present invention, and FIG. 2 is a plan view showing a riveting unit in the riveting apparatus according to the preferred embodiment of the present invention.

Referring to FIGS. 1 and 2, the riveting apparatus according to the preferred embodiment of the present invention includes a riveting unit 100, a moving unit 200, a first moving guide unit 300, a second moving guide unit 400, a first position sensor 500, and a second position sensor 600.

First, the riveting unit 100, which is configured to fasten a fastening member at a predetermined position, includes a riveting unit body 110, a riveting unit head 120, a switch 130, and a locking unit 140.

The riveting unit body 110 may be formed in the shape of a column. In the figure, the riveting unit body is shown as being formed in a cylindrical shape; however, the present invention is not limited thereto.

In addition, the riveting unit body 110 may have a hydraulic device (not shown) mounted therein.

The riveting unit head 120 is located at a lower end of the riveting unit body 110, is brought into tight contact with a fastening member (not shown) in order to fasten the fastening member to an object, and fastens the fastening member using hydraulic pressure received through the hydraulic device mounted in the riveting unit body 110.

The switch 130 is provided at the side of the riveting unit body 110, and when pressed by a worker, transmits a signal to the hydraulic device mounted in the riveting unit body 110 such that hydraulic pressure is supplied in a direction toward the riveting unit head 120.

The locking unit 140 may include a locking unit body 141 and a locking controller 142.

The locking unit body 141 may be located at the side of the riveting unit body 110, and at this time the locking unit body may be located so as to overlap the switch 130 on a vertical extension line.

The locking unit body 141 may have a hydraulic device mounted therein.

The locking controller 142 may be formed in the shape of a bar, a part of the locking controller may be inserted into the locking unit body 141 or may extend through the locking unit body 141, and the locking controller may be moved upwards and downwards by the hydraulic device mounted in the locking unit body 141.

When the riveting unit 100 is moved and deviates from a predetermined position, the locking controller 142 may be moved upwards by the hydraulic device of the locking unit body 141, whereby the locking controller comes into contact with the switch 130 to stop a riveting process, as shown in (a) of FIG. 2.

In addition, when the riveting unit 100 is exactly located at a fastening position, the locking controller 142 may be moved downwards by the hydraulic device of the locking unit body 141, whereby the riveting process may be continued, as shown in (b) of FIG. 2.

Next, the moving unit 200 may include a moving unit body 210, a guide rail 220, a first connection portion 230, and a second connection portion 240.

The moving unit body 210 may be formed in the shape of a flat plate, as shown in the figure; however, the present invention is not limited thereto, and the moving unit body may be formed in the shape of a column.

The guide rail 220 may be located at one side of the moving unit body 210, and may be connected to the first connection portion 230 to move and guide the first connection portion 230 in a vertical direction.

One side of the first connection portion 230 is connected to the guide rail 220, as described above, and the other side of the first connection portion is connected to the riveting unit body 110 of the riveting unit 100 to allow the riveting unit 100 to move along the guide rail 220 in the vertical direction.

The second connection portion 240 is located at an upper part of the moving unit body 210, and allows the moving unit body 210 and the riveting unit 100 connected to the moving unit 200 to move along a first movement shaft 310 of the first moving guide unit 300 and the moving unit body 210 in an X-axis direction shown in the figure.

Next, the first moving guide unit 300 may include a first movement shaft 310, a third connection portion 320, and a cover member 330.

The first movement shaft 310 may be connected to the second connection portion 240 of the moving unit 200 to guide the movement of the first moving unit 200 in the X-axis direction.

In this case, two or more first movement shafts 310 are preferably provided, and the first movement shafts may be connected to the second connection portion 240.

This has the advantage that it is possible to prevent the occurrence of positional error factors, such as vibration that may occur when the moving unit 200 connected to the first movement shaft 310 is moved along the first movement shaft 310 and twisting of the moving unit 200 when one first movement shaft 310 is formed, whereby it is possible to improve accuracy.

The third connection portion 320 may be formed at each end of the first movement shaft 310.

One side of each of the third connection portions 320 is connected to the first movement shaft 310 and the other side of each of the third connection portions is connected to a second movement shaft 410 of the second moving guide unit 400 to allow the first moving guide unit 300 to move along the second movement shaft 410.

The cover member 330 may be formed at an upper surface, a lower surface, and side surfaces of one of the third connection portions 320, and may not be formed at the side surface thereof in a direction toward the second movement shaft 410.

The second moving guide unit 400 may include a second movement shaft 410 and a support member 420.

The second movement shaft 410 may be located at each of opposite ends of the first movement shaft 310 at a right angle.

Each of the second movement shafts 410 may be connected to the first movement 310 via the third connection portion 320, and may guide the movement of the first moving guide unit 300 in a Y-axis direction.

The support member 420 may be provided at each end of the second movement shaft 410, and the support member 420 may be connected and fastened to a wall of an installation site, another apparatus, etc. to support and fix the riveting apparatus according to the present invention.

The support member 420 may be installed at a required position by a bolt or an adhesive, and any support and fastening method may be used without limitation as long as it is possible to install the support member at a required position.

The first position sensor 500 may be a laser sensor configured to radiate a laser, and may be located under the third connection portion 320 at one side of the first moving guide unit 300, more preferably at a lower surface of the cover member 330.

The first position sensor 500 radiates a laser toward the second connection portion 240 of the moving unit 200 to measure the position coordinates of the riveting unit 100 in the X-axis direction.

The second position sensor 600 may be a laser sensor configured to radiate a laser, and may be located under the support member 420 located at one side of the plurality of support members 420 of the second moving guide unit 400.

The second position sensor 600 radiates a laser toward the third connection portion 320 of the first moving guide unit 300 to measure the position coordinates of the riveting unit 100 in the Y-axis direction.

Consequently, the first position sensor 500 and the second position sensor 600 radiate lasers to measure the XY-axis coordinates of the riveting unit 100 such that the riveting unit can be moved to the position having the measured coordinates.

In addition, the fastening position may be managed as coordinates through the first position sensor 500 and the second position sensor 600, whereby it is possible to prevent omission of fastening members at all positions.

FIG. 3 is a flowchart illustrating a riveting method using the riveting apparatus according to the present invention.

Referring to FIG. 3, the riveting method using the riveting apparatus according to the present invention may include a step of moving the riveting unit 100, a step of determining whether the riveting unit 100 is at a correct position, a step of performing a riveting process through the riveting unit 100, and a step of moving the riveting unit 100 to the next position.

The step of moving the riveting unit 100 is a step of moving the riveting unit 100 to predetermined coordinates through the moving unit 200, the first moving guide unit 300, and the second moving guide unit 400.

The step of determining whether the riveting unit 100 is at the correct position is a step of measuring the XY-axis coordinates of the riveting unit 100 through the first position sensor 500 and the second position sensor 600 and determining whether the measured coordinates coincide with predetermined coordinates.

At this time, if the XY-axis coordinates of the riveting unit 100 measured through the first position sensor 500 and the second position sensor 600 do not coincide with the predetermined coordinates, the locking controller 142 of the locking unit 140 may be moved upwards to prevent operation of the switch 130, thereby preventing fastening at an incorrect position.

In addition, a step of moving the riveting unit 100 to the predetermined coordinates again may be further performed in the state in which the operation of the switch 130 is prevented by the locking controller 142.

The step of performing the riveting process through the riveting unit 100 is a step in which the riveting unit 100 moved downwards along the guide rail 220 fastens a fastening member to an object after the riveting unit 100 is located at the predetermined coordinates.

The step of moving the riveting unit 100 to the next position is a step in which the riveting unit 100 is moved upwards along the guide rail 220 and is then moved to the next fastening position by the moving unit 200, the first moving guide unit 300, and the second moving guide unit 400 after the fastening member is fastened through the riveting unit 100.

At this time, after being moved to the next fastening position, the step of determining whether the riveting unit 100 is at the correct position, the step of performing the riveting process through the riveting unit 100, and the step of moving the riveting unit 100 to the next position may be repeated.

The present invention may be a battery module manufactured using the aforementioned riveting apparatus. In addition, the present invention may be a device having the battery module according to the present invention mounted therein. For example, the device may be an electronic device including a large-capacity battery, such as an electric vehicle, a hybrid electric vehicle, or a plug-in hybrid electric vehicle.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Riveting unit
110: Riveting unit body
120: Riveting unit head
130: Switch
140: Locking unit
141: Locking unit body 142: Locking controller
200: Moving unit
210: Moving unit body
220: Guide rail
230: First connection portion
240: Second connection portion
300: First moving guide unit
310: First movement shaft
320: Third connection portion
330: Cover member
400: Second moving guide unit
410: Second movement shaft
420: Support member
500: First position sensor
600: Second position sensor

The invention claimed is:

1. A riveting apparatus comprising:
a riveter;
a mover connected to the riveter, the mover being configured to move the riveter;
a first moving guide configured to guide a longitudinal movement of the mover;
a pair of second moving guides located at longitudinal opposite ends of the first moving guide, the pair of second moving guides being configured to guide a transverse movement of the first moving guide;
a first position sensor provided under one end of the first moving guide; and
a second position sensor provided under one end of one of the pair of second moving guides.

2. The riveting apparatus according to claim 1, wherein the riveter comprises a riveter body, a riveter head provided under the riveter body, a switch located at a side surface of an upper end of the riveter body, and a lock located at a lower end of the switch.

3. The riveting apparatus according to claim 2, wherein the lock comprises a lock body connected to the riveter body and a locking controller partially inserted in the lock body.

4. The riveting apparatus according to claim 3, wherein the lock body has a hydraulic device mounted therein, and
wherein the locking controller is configured to be moved upwards and downwards by the hydraulic device.

5. A riveting method using the riveting apparatus according to claim 1, the riveting method comprising:
moving the riveter;
determining whether the riveter is at a correct position;
performing a riveting process through the riveter; and
moving the riveter to a next position.

6. The riveting method according to claim 5, wherein, after moving the riveter again, the step of determining whether the riveter is at the correct position and the subsequent steps are performed again.

7. A riveting apparatus comprising:
a riveter;
a mover connected to the riveter, the mover being configured to move the riveter;
a first moving guide configured to guide a longitudinal movement of the mover;
a pair of second moving guides located at longitudinal opposite ends of the first moving guide, the pair of second moving guides being configured to guide a transverse movement of the first moving guide;
a first position sensor provided under one end of the first moving guide; and
a second position sensor provided under one end of one of the pair of second moving guides,
wherein the mover comprises a mover body, a guide rail formed at a side surface of the mover body so as to extend in a height direction, a first connection portion configured to connect the guide rail and the riveter to each other, and a second connection portion configured to connect the mover body and the first moving guide to each other, and
wherein the first connection portion is moved along the guide rail in a vertical direction.

8. The riveting apparatus according to claim 7, wherein the first moving guide comprises at least one first movement shaft, a third connection portion located at each of opposite ends of the at least one first movement shaft, and a cover member configured to cover at least a part of each of the third connection portions.

9. The riveting apparatus according to claim 8, wherein the at least one first movement shaft is a plurality of shafts.

10. The riveting apparatus according to claim 8, wherein each of the second moving guides comprises a second movement shaft and a support member located at each of opposite ends of the second movement shaft.

11. The riveting apparatus according to claim 10, wherein the first position sensor is a laser sensor.

12. The riveting apparatus according to claim 11, wherein the laser sensor radiates a laser toward the second connection portion.

13. The riveting apparatus according to claim 10, wherein the second position sensor is a laser sensor.

14. The riveting apparatus according to claim 13, wherein the laser sensor radiates a laser toward the third connection portion.

15. A riveting method using a riveting apparatus having a riveter, a mover connected to the riveter, the mover being configured to move the riveter, a first moving guide configured to guide a longitudinal movement of the mover, a pair of second moving guides located at longitudinal opposite ends of the first moving guide, the pair of second moving guides being configured to guide a transverse movement of the first moving guide, a first position sensor provided under one end of the first moving guide, and a second position sensor provided under one end of one of the pair of second moving guides, the riveting method comprising:
   moving the riveter;
   determining whether the riveter is at a correct position;
   performing a riveting process through the riveter; and
   moving the riveter to a next position,
     wherein, when the riveter is not at the correct position in the step of determining whether the riveter is at the correct position, the riveter is locked by a lock.

\* \* \* \* \*